(No Model.)
J. H. DAY.
PROCESS OF AND MACHINE FOR SPREADING VISCOUS SUBSTANCES.
No. 452,466. Patented May 19, 1891.
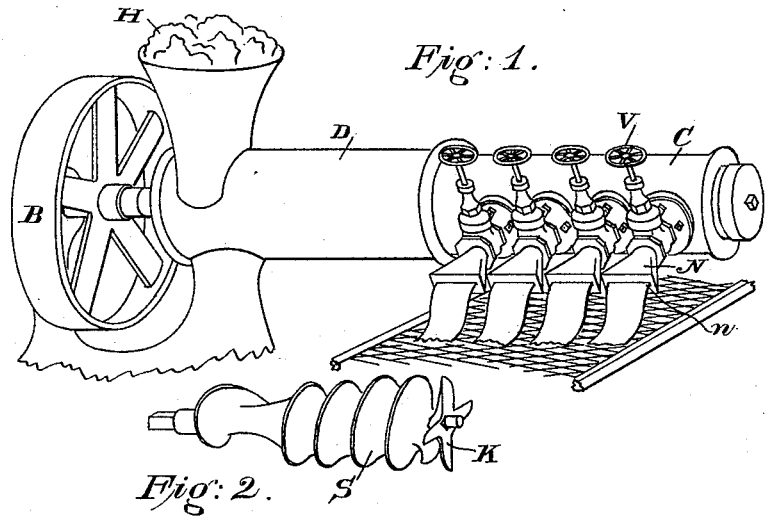
Fig: 1.
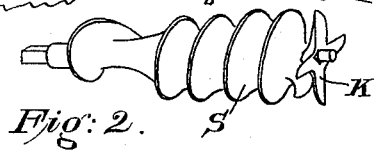
Fig: 2.
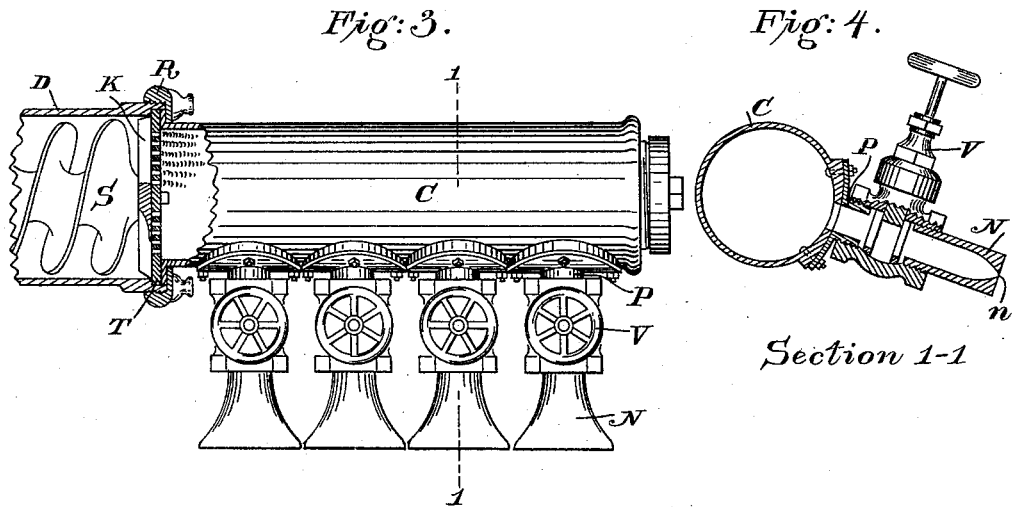
Fig: 3. Fig: 4.
Section 1-1
WITNESSES:
John W. Fisher
Grace T. Many
INVENTOR
John H. Day
BY
Frederick W. Cameron
ATTORNEY.

UNITED STATES PATENT OFFICE.

JOHN H. DAY, OF ALBANY, NEW YORK.

PROCESS OF AND MACHINE FOR SPREADING VISCOUS SUBSTANCES.

SPECIFICATION forming part of Letters Patent No. 452,466, dated May 19, 1891.

Application filed April 7, 1890. Serial No. 346,903. (No model.)

*To all whom it may concern:*

Be it known that I, JOHN H. DAY, a citizen of the United States, residing at the city and county of Albany, State of New York, have invented a new and useful Process of and Machine for Spreading Viscous Substances, of which the following is a specification.

My invention relates to the process of and machine for spreading substances of a sticky, gluey nature, or of a semi-liquid consistency, for drying; and the objects of my invention are, first, to develop a process for spreading and drying viscous substances in a thin ribbon-like form, depositing the same upon a perforated disk or screen in order that the moisture contained therein may be readily expelled, and, second, to produce a machine by means of which said process may be put into execution. I attain these objects in the following manner and by means of the mechanism illustrated in the accompanying drawings, in which—

Figure 1 is a perspective view of my apparatus. Fig. 2 is a detail view of the propeller. Fig. 3 is a plan, and Fig. 4 a vertical section, along the line 11 on Fig. 3.

Similar letters refer to similar parts throughout the several views.

For the purpose of drying many substances, especially those of a viscous nature—such as paste, glue, and many chemical compounds—it is desirable to cause them to assume a thin ribbon-like form in order that the water may be readily expelled by evaporation or by other means. I use this process and machine particularly in preparing dry flour paste, which is ordinarily composed of flour and water, and from which it is desirable to expel the moisture. To accomplish this result the substance to be treated is placed in the hopper H, and coming into contact with the propelling-screw S, attached to the power-pulley B, it is moved forward by the action of the screw and comes into contact with the rotating knife K, attached to the screw S near its point, where it is cut into small particles capable of being forced through the perforated plate T, placed at the end of the cylinder D, near the knife K. To the end of the cylinder D of the feeding and cutting machine I attach by suitable coupling R, Fig. 3, the cylinder C, which is open at the end nearest the perforated plate T and closed by a suitable cap at the opposite end. The coupling referred to is made by screwing the ring R on the cylinder C onto the cylinder D, there being threads cut on the cylinder D near the end to which the cylinder C is to be attached.

The mechanism thus described is similar to that described by me in my patent on machine for spreading viscous substances, dated September 10, 1889, No. 410,822.

Through the side of the cylinder C, I cut a series of slots, and on each of the upper and lower sides of the slots I attach in any suitable manner threaded studs P, to which is secured a valve V. To the front of the valve-chamber, opposite the slot in the cylinder, I secure a pipe N. The pipe N is flattened and made wider near its discharge-orifice than at its point of juncture with the valve-chamber. The upper and lower interior surfaces of the pipe N gradually approach each other in extending from the valve to the discharge-orifice, the discharge-orifice being much wider and of less depth than the entering-orifice. The valve V is an ordinary gate-valve, and is so constructed that by the operation of the valve-wheel the plunger will enter the valve-chamber to the extent desired, making the passage between the cylinder and the pipe either large or small, thus regulating the discharging of the substances from the cylinder.

The substance entering the cylinder C is forced through the slots and passes into the valve-chamber through the pipe N, and emerges from the discharge-orifice n in thin ribbon-like layers.

Beneath the cylinder C, I place a perforated disk or screen, usually constructed of wire secured to a suitable frame, upon which the thin layers are collected, the screen or disk being moved slowly forward in order that the substance may be discharged thereon and retain its ribbon-like form.

What I claim as my invention, and desire to secure by Letters Patent, is—

1. In a machine for spreading viscous substances, the combination of a cylinder having a longitudinal slot through its side, with a valve attached to said cylinder communicating with said slot and provided with a discharge-pipe, all substantially as described, and for the purpose set forth.

2. In a machine for spreading viscous substances, the combination of a cylinder provided with a longitudinal slot, with a valve attached to said cylinder communicating with said slot and provided with a discharge-pipe attached to said valve, said discharge-pipe provided with an elongated longitudinal discharge-orifice, all substantially as described, and for the purpose set forth.

3. The process of spreading viscous substances, which consists in placing such substances into a vessel, applying force thereto, causing the substance to be discharged through a shallow orifice in a thin ribbon-like form and collected and exposed upon a perforated disk or screen, substantially as described, and for the purpose set forth.

JOHN H. DAY.

Witnesses:
FREDERICK W. CAMERON,
WALTER E. WARD.